ized Patent
Brown et al.

(10) Patent No.: US 10,487,808 B2
(45) Date of Patent: Nov. 26, 2019

(54) DIRECTION CONTROLLED SERVICE APPARATUS

(71) Applicant: The Boeing Company, Chicago, IL (US)

(72) Inventors: Douglas A. Brown, Edmonds, WA (US); Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 593 days.

(21) Appl. No.: 15/257,177

(22) Filed: Sep. 6, 2016

(65) Prior Publication Data

US 2017/0009751 A1 Jan. 12, 2017

Related U.S. Application Data

(62) Division of application No. 13/863,360, filed on Apr. 15, 2013, now Pat. No. 9,457,907.

(51) Int. Cl.
| | |
|---|---|
| *B64D 13/00* | (2006.01) |
| *F03G 7/06* | (2006.01) |
| *B60H 1/34* | (2006.01) |
| *B64D 11/00* | (2006.01) |

(52) U.S. Cl.
CPC .......... *F03G 7/065* (2013.01); *B60H 1/3442* (2013.01); *B64D 11/00* (2013.01); *B64D 13/00* (2013.01); *B64D 2011/0038* (2013.01); *B64D 2011/0053* (2013.01); *B64D 2013/003* (2013.01)

(58) Field of Classification Search
CPC ....... F03G 7/065; B60H 1/3442; B64D 11/00; B64D 13/00; B64D 2011/0038; B64D 2011/0053; B64D 2013/003
USPC .......................................................... 454/76
See application file for complete search history.

(56) References Cited

PUBLICATIONS

Canadian Patent Office, "Examination Search Report," App. No. 2,968,157 (dated May 25, 2018).

*Primary Examiner* — Helena Kosanovic
(74) *Attorney, Agent, or Firm* — Walters & Wasylyna LLC

(57) ABSTRACT

A direction controlled service apparatus may include a mounting assembly, a housing assembly configured to operably connect to the mounting assembly, the housing assembly being movable with respect to the mounting assembly, and a plurality of actuators connected between the mounting assembly and the housing assembly, each actuator of the plurality of actuators being configured to contract upon a current being applied to the actuator to rotate the housing assembly with respect to the mounting assembly.

20 Claims, 14 Drawing Sheets

DIRECTION CONTROLLED SERVICE APPARATUS

PRIORITY

This application is a divisional of U.S. Ser. No. 13/863,360 filed on Apr. 15, 2013, the entire contents of which are incorporated herein by reference.

FIELD

The present disclosure is generally related to aircraft passenger service units and, more particularly, to a direction controlled service apparatus for use with a passenger service panel of an aircraft.

BACKGROUND

Passenger service units are found in commercial or passenger aircraft above the rows of seats and are used to provide various service functions to the passengers. Typically these service functions include reading lights, personal air outlets, commonly referred to as gaspers, illuminated display symbols, and a flight attendant call. The controls for these service functions are generally disposed on a service panel of the passenger service unit above the seats.

One major disadvantage of the service function control is location. For example, it may be difficult for a shorter passenger, a child, or a passenger with limited mobility to reach the controls of the service panel. Thus, the passenger may not have the ability to turn on the reading light, adjust the air flow of the personal air outlet, or adjust the direction or position of either the reading light or the personal air outlet.

Accordingly, those skilled in the art continue with research and development efforts in the field of aircraft passenger service unit controls.

SUMMARY

In one embodiment, the disclosed direction controlled service apparatus may include a mounting assembly, a housing assembly configured to operably connect to the mounting assembly, the housing assembly being movable with respect to the mounting assembly, and a plurality of actuators connected between the mounting assembly and the housing assembly, each actuator of the plurality of actuators being configured to contract upon a current being applied to the actuator.

In another embodiment, the disclosed direction controlled service apparatus may include a housing assembly having a ball-shaped housing, the ball-shaped housing including a first ring, a mounting assembly having a socket housing configured to receive the ball-shaped housing, the socket assembly including a second ring; a plurality of actuators connected between the first ring and the second ring, the plurality of actuators being spaced circumferentially about the first ring and the second ring, the ball-shaped housing being configured to rotate with respect to the socket housing upon contraction of at least one actuator of the plurality of actuators, and each actuator of the plurality of actuators being a shape memory alloy wire.

In another embodiment, the disclosed direction controlled service apparatus may include a shutter assembly for controlling an air flow of the direction controlled service apparatus, the shutter assembly including a collar configured to connect to an opening in a housing assembly of the direction controlled service apparatus, a plurality of blades disposed within the collar, the plurality of blades being positioned adjacent to the opening, each blade of the plurality of blades being configured to overlap an adjacent blade, a blade actuator operably connected to each blade of the plurality of blades, the blade actuator including a fixed first end and a second end, the blade actuator being configured to contract upon a current being applied to the blade actuator, and a toothed rack connected to the second end of the blade actuator, the rack being movable upon contraction of the blade actuator, a locking mechanism movable between an engaged configuration and a disengaged configuration, the locking mechanism being configured to operably engage the rack upon being set in the engaged configuration, and a locking mechanism actuator operably connected to the locking mechanism, the locking mechanism actuator being configured to contract upon a current being applied to the locking mechanism actuator to move the locking mechanism to the disengaged configuration, wherein the plurality of blades at least partially overlap in succession upon contraction of the blade actuator to at least partially expose the opening, and wherein each blade of the plurality of blades is fixed relative to the adjacent blade upon engagement of the locking mechanism to the rack.

In another embodiment, the disclosed direction controlled service apparatus may include a passenger service unit including a plurality of direction controlled service apparatus, each direction controlled service apparatus including a ball-shaped housing, a socket housing configured to receive the ball-shaped housing, a first ring connected to the ball-shaped housing, a second ring connected to the socket housing, a plurality of actuators connected between the first ring and the second ring, the plurality of actuators being spaced circumferentially about the first and second rings; each actuator of the plurality of actuators being configured to contract upon a current being applied to the actuator to rotate the ball-shaped housing with respect to the socket housing, at least one current generating circuit electrically connected to the plurality of actuators, the current generating circuit being configured to apply electrical current to each actuator of the plurality of actuators, and a control board electrically connected to the at least one current generating circuit, the control board being configured to receive a signal, the signal representing a position of the ball-shaped housing with respect to the socket housing.

Other aspects of the disclosed direction controlled service apparatus will become apparent from the following detailed description, the accompanying drawings and the appended claims.

DETAILED DESCRIPTION

Figure 1:
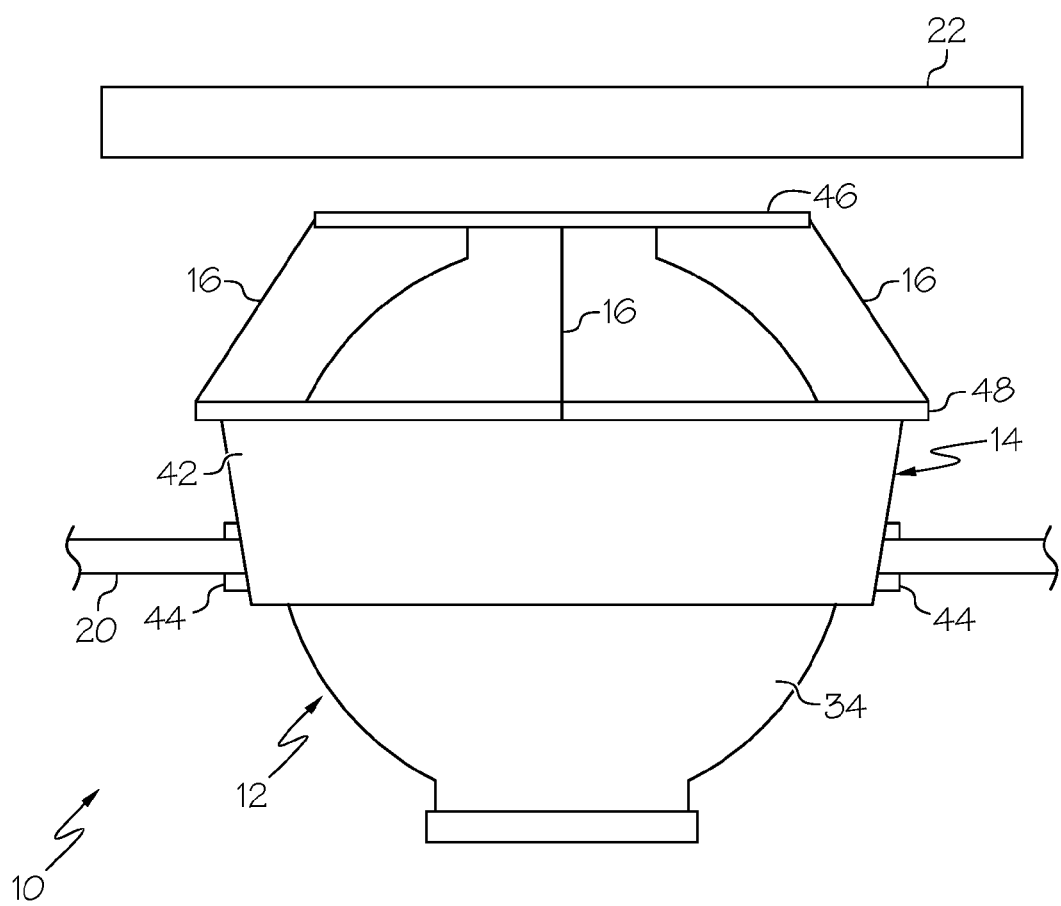
FIG. 1 is a side elevational view of an embodiment of the disclosed direction controlled service apparatus.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, an embodiment of the disclosed direction controlled service apparatus, generally designated 10, may include a housing assembly 12 that may be supported for universal movement within a mounting assembly 14. The housing assembly 12 may be movable (e.g., rotated) with respect to the mounting assembly 14 by a plurality of actuators 16 connected between the housing assembly 12 and the mounting assembly 14.

Figure 2:
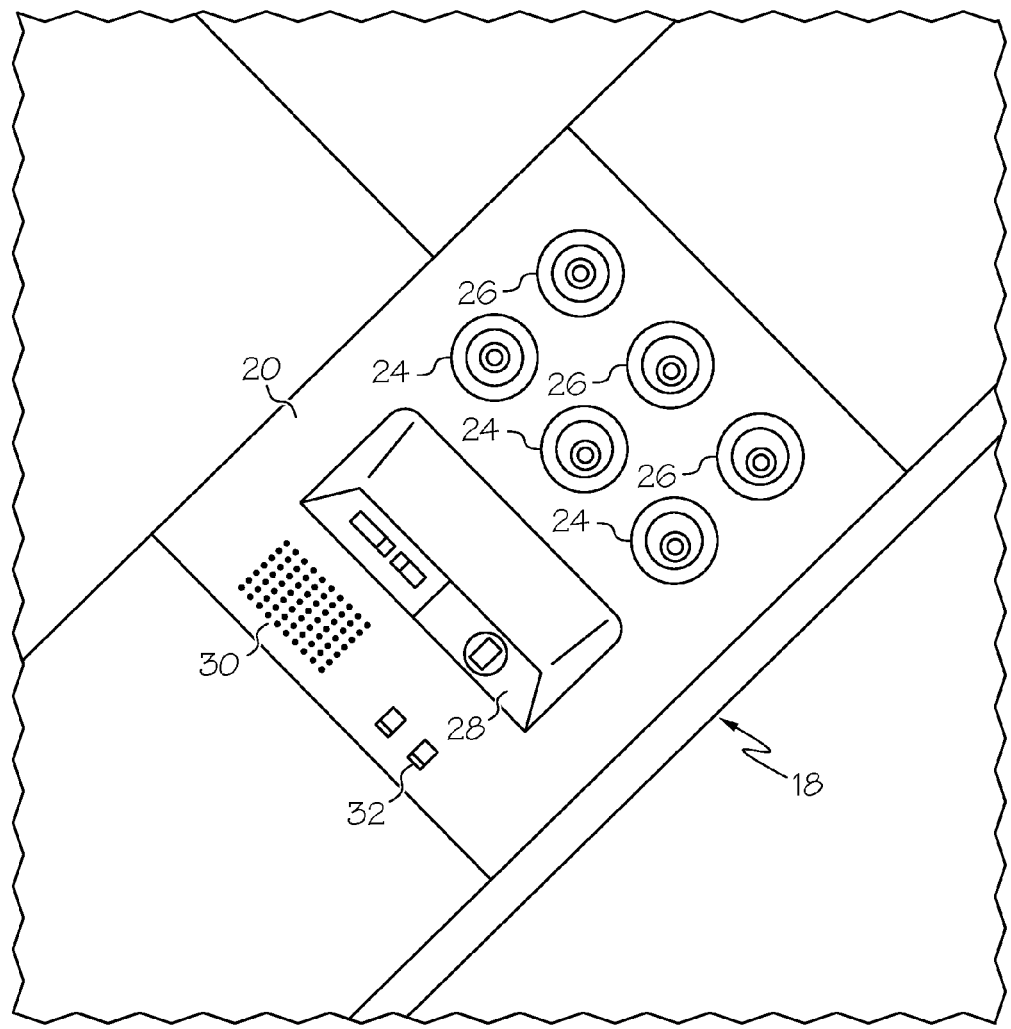
FIG. 2 is a front view of an example implementation of the disclosed direction controlled service apparatus utilized in an aircraft passenger service unit.

Referring to FIG. 2, an example implementation of the disclosed direction controlled service apparatus 10 may be utilized as part of a passenger service unit (PSU) 18 of a commercial aircraft cabin. The front view illustrates a cabin-side view of the PSU 18, which is available to a passenger located inside the aircraft. The PSU 18 may include a service panel 20 and a control board 22 (FIG. 1). The service panel 20 may be positioned in front of the control board 22 on the cabin side of the aircraft for designated use and mounting of the PSU 18.

Through the PSU 18, a passenger may be provided with a plurality of service functions based on functional electronic units. In the example illustrated in FIG. 2, the PSU 18 may include reading lights 24, personal air outlets 26, a plurality of display fields 28 separated from one another for the representation or display of information (e.g., fasten seatbelt indicator or restriction of mobile devices), a loud speaker 30, a plurality of service buttons 32, and the like. Each of the display field 28 may include an assigned light (e.g., light emitting diode (LED)) to illuminate the display field 28 from behind in order to highlight the symbol located on the display field 28. The speaker 30 may include an acoustic unit connected to an acoustic module arranged on the circuit board 22 by a cable or other suitable contact elements (e.g., contact pins that connect automatically during mounting of the service panel 20). The service buttons 32 may include a switching element arranged on the circuit board and a switch mounted on the service panel 20. The service buttons 32 may be mechanically actuated and activated by a passenger (e.g., by pressing the service button 32). The service buttons 32 may, for example, notify the cabin crew of an emergency or a passenger need.

It should be noted that the number of components respectively included on the PSU 18 may differ from the number shown in FIG. 2. For example, more or fewer service buttons 32, reading lights 24, personal air outlets 26, etc. may be provided.

The control board 22 may include a plurality of functional electronic units, for example having one or more electronic components, each of the electronic components being assigned to at least one of the service functions of the PSU 18. In an example implementation, the functional units may be connected on a common circuit board permitting a cabling-free structure of the PSU 18. For example, connection of the control board 22 to an on-board electrical system of the aircraft may be configured using a single cable connection. It is also possible to use cabling-free plug connections, which are connected automatically when the PSU 18 is installed. Contactless connections are also contemplated, for example connections based on radio or optical signal transmission between the control board 22, or more precisely the electronic modules of the functional service units, and the on-board electrical system.

As will be discussed in further detail herein, at least one of the functional service units (e.g., the reading light 24 and/or the personal air outlet 26) may include the disclosed direction controlled service apparatus 10, which may provide a passenger with the ability to remotely control the position of the service unit and thus the direction of the functional output (e.g., light or an air flow).

Figure 3:
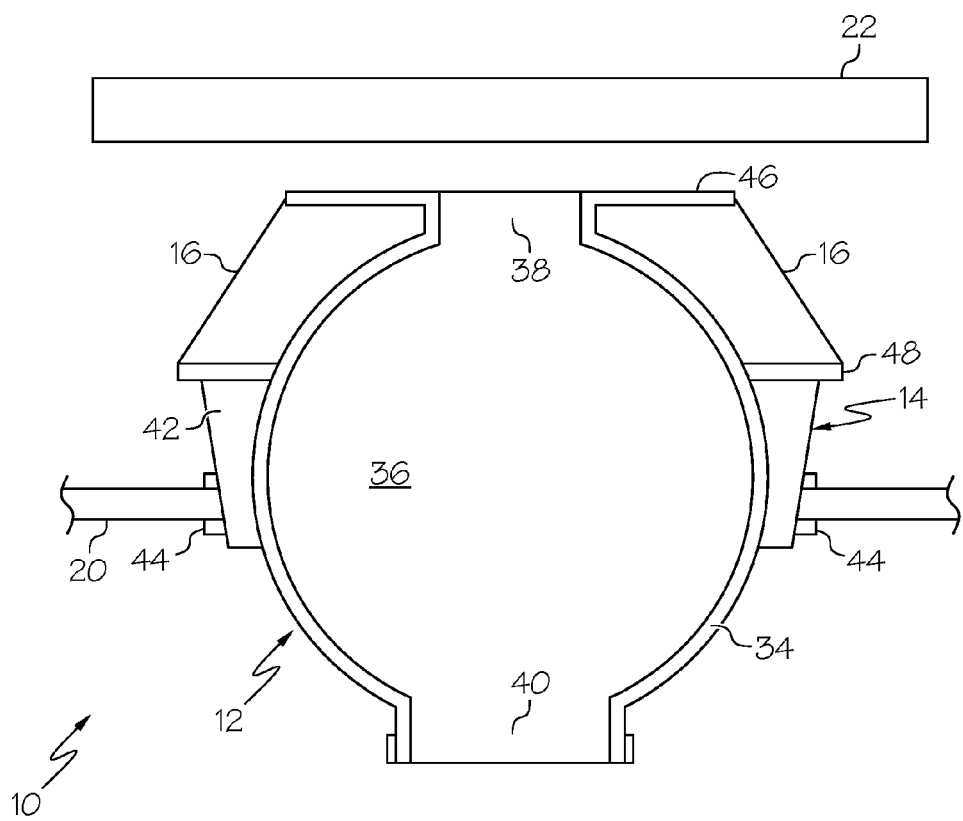
FIG. 3 is a side sectional view of the disclosed direction controlled service apparatus.

Referring to FIG. 3, the housing assembly 12 may include a ball-shaped housing 34 having an interior space 36, a first opening 38 disposed at an upper end of the ball-shaped housing 34 configured to connect the interior space 36 to a region above the ball-shaped housing 34, and a second opening 40 disposed at a lower end of the ball-shaped housing 34 extending downward from the interior space 36. The ball-shaped housing 34 may be formed of any suitably durable and lightweight material, such as a thermoplastic material, aluminum, an alloy, and the like.

The mounting assembly 14 may include a socket housing 42 having an inner circumferential surface suitably sized and shaped to receive the outer circumferential surface of the ball-shaped housing 34. For example, the socket housing 42 may include an annular flange having a plurality of longitudinally extending fingers and a locking ring that encircles the flange across the tips of the fingers to hold the fingers against the outer circumferential surface of the ball-shaped housing 34. As another example, the socket housing 42 may include an annular race mounted within the service panel 20 having a partially spherical shape to provide a front hemispherical engagement with the ball-shaped housing 34. Thus, the ball-shaped housing 34 and the socket housing 42 may provide for a swivel connection for the housing assembly 12 and the mounting assembly 14. Other ball-and-socket connections are also contemplated.

Referring back to FIG. 1, the mounting assembly 14 may be connected to the service panel 20 in a fixed position. For example, the mounting assembly 14 may include a plurality of feet 44 extending radially outward from a base of the socket housing 42 (e.g., the flange or the race). The feet 44 may hold the socket housing 42 in position on the service panel 20 and may be deflected in a radial direction during connection of the direction controlled service apparatus 10 to the service panel 20. Alternatively, the mounting assembly 14 may include a circumferential ridge and a snap ring to secure the socket housing 42 to a perimeter rim of an aperture in the service panel 20.

Referring again to FIGS. 1 and 3, the housing assembly 12 may include a first ring 44 extending radially outward from the ball-shaped housing 34. The first ring 46 may be disposed about or proximate the upper end of the ball-shaped housing 34. The mounting assembly 14 may include a second ring 48 extending radially outward from the socket housing 42. The second ring 48 may be disposed about or proximate an upper end of the socket housing 34. The first 46 and second 48 rings may each include a solid annular body extending along the respective circumferences of the ball-shaped housing 34 and the socket housing 42. Alternatively, the first 46 and second 48 rings may each include a plurality of tabs spaced along the respective circumferences of the ball-shaped housing 34 and the socket housing 42.

Figure 4:
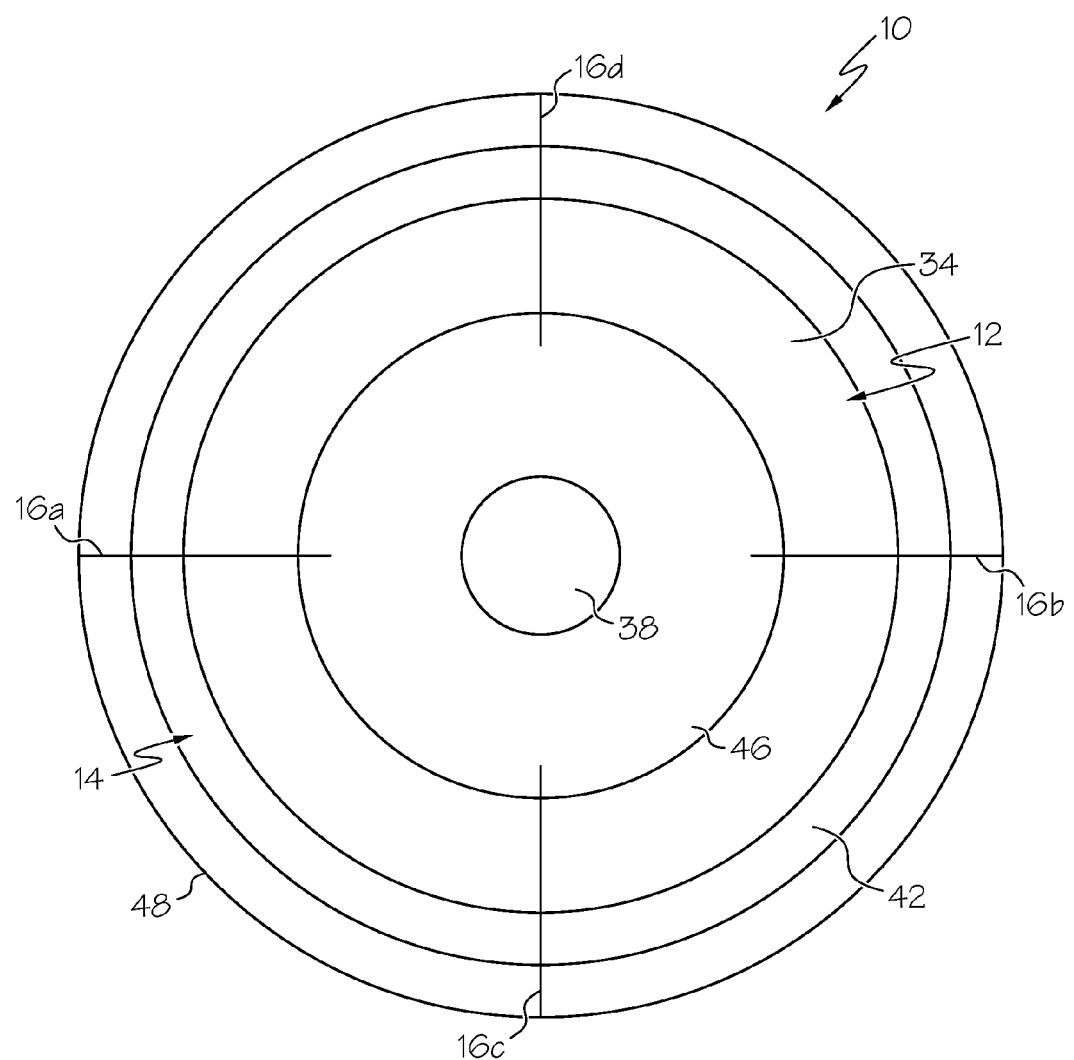
FIG. 4 is a top plan view of the disclosed direction controlled service apparatus.

Referring to FIGS. 1 and 4, each of the plurality of actuators 16 may be interconnected between the first ring 46 and the second ring 48. Each of the plurality of actuators 16 may be configured to contract (e.g., shorten) in response to an applied electrical current to rotate the housing assembly 12 with respect to the mounting assembly 14. As shown in FIG. 4, the plurality of actuators 16 may be spaced circumferentially about the ball-shaped housing 34 and the socket housing 42. It should be noted that the number of actuators 16 connected between the first ring 46 and second ring 48 may differ from the number shown in FIG. 1. For example, more or fewer actuators 16 may be provided.

Each actuator 16 may be a wire formed of a shape memory alloy (SMA). For example, the SMA may be made from copper-aluminum-nickel or nickel-titanium alloys by alloying zinc, copper, gold and iron. An SMA is an alloy that exhibits a thermoelastic martensite transformation, such that it can be deformed while in the martensite phase and the deformation is recovered when the SMA returns to the austenite phase. An SMA is sensitive to temperature or heat. Such heating may be accomplished through resistive heating (e.g., by passing an electrical current through the SMA part) or through a separate heating element. For example, the SMA material may temporarily undergo a dimensional change, such as a change in length at a certain temperature. For example the SMA material may contract (e.g., shorten) at a temperature that is above the ambient temperature for the SMA material, and expand at a relatively lower temperature to return to its original condition (e.g., original length). In this way, the wire actuator 16 made of the SMA material, may undergo a change in length and a return toward its original length one or more times via temperature treatment or repeated temperature cycling.

In the process of undergoing a dimensional change, as described above, the SMA material may go through a reversible phase transition or transformation, or a reversible structural phase transition, upon a change in temperature. The SMAs may have a low temperature phase, or martensitic phase, and a high temperature phase, or austenitic phase. The particular phase transition associated with a particular SMA material may vary.

Figure 5:
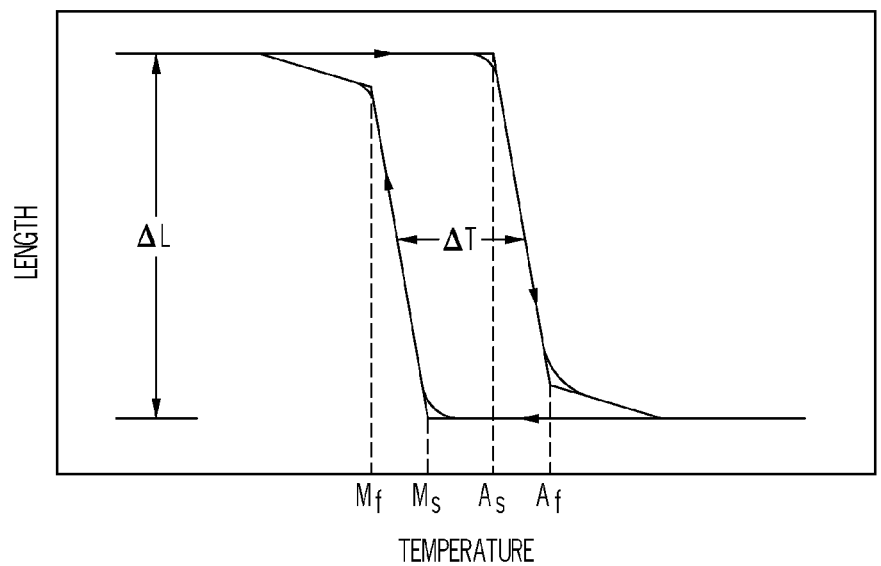
FIG. 5 is a length versus temperature graph for a typical shape memory alloy element.
Figure 6:
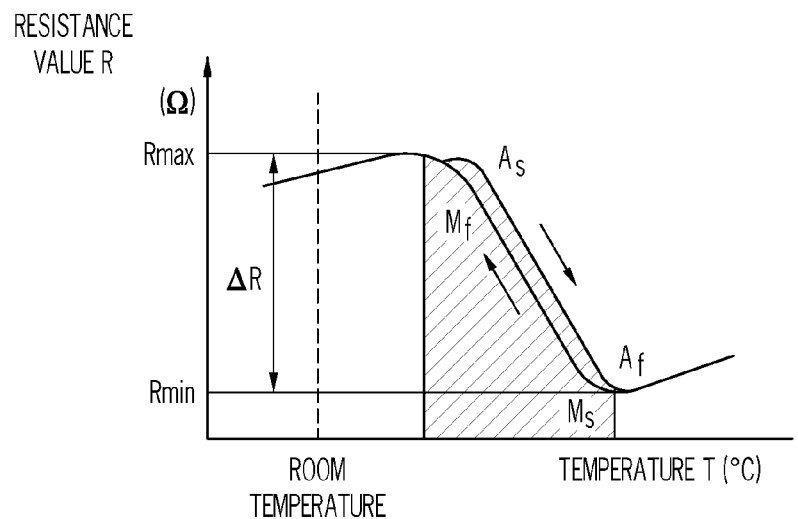
FIG. 6 is a resistance versus temperature graph for a typical shape memory alloy element.

The transition from the martensite (low temperature) phase to the austenite (high temperature) phase in SMAs does not happen instantaneously at a specific temperature but rather progresses incrementally over a temperature range. FIG. 5 shows the relationship between displacement and temperature, indicating the austenite start ($A_s$) and austenite finish ($A_f$) temperatures, as well as the martensite start ($M_s$) and martensite finish ($M_f$) temperatures. In the temperature range indicated by $\Delta T$, the SMA consists of a mixture of austenite and martensite. As can be seen, substantially no change in length occurs below $A_s$, and substantially no further change in length occurs above $A_f$, as the SMA is heated. Similarly, on cooling substantially no change in length occurs above $M_s$, and substantially no further change in length occurs below $M_f$. There is a relationship between the electrical resistance of an SMA part and its temperature, as is shown in FIG. 6, which is shown for an SMA having an $M_f$ above room temperature. As can be seen, within the shaded region between $R_{min}$ and $R_{max}$, the resistance can be used as an analog for the SMA temperature and hence it is possible to deduce the percentage transformation between the two phases based entirely on the resistance value with no direct measurement of temperature.

SMAs suitable for room temperature applications may be those that have an austenite-martensite transition range somewhat above an expected ambient temperature. For example, such as a martensite finish temperature of about 30-50° C., so that the SMA will remain in its martensite phase in the absence of applied heating, and an austenite finish temperature that is low enough to be compatible with common engineering plastics, such as an austenite finish temperature of about 80-100° C., to minimize the amount of heating (e.g., electrical energy input to the SMA) required to complete the martensite-to-austenite transition. SMAs with other transition temperature ranges may be chosen for actuators 16 designed to operate at decreased (e.g., below 0° C.) or elevated (e.g., above 100° C.) temperature environments.

It should be noted that SMA wire as used in the disclosure may refer to SMA material of elongate form, capable of contraction/elongation along a longitudinal axis. Thus, the term wire does not imply a circular cross-section, although that may be the typical cross-section, but includes cross-sections that may be elliptical, square, rectangular, or the like.

It is contemplated that any material that expands by going through a phase transition at a certain temperature and shrinks at a different temperature to return toward its original condition may also be used as the actuators 16.

Figure 7:
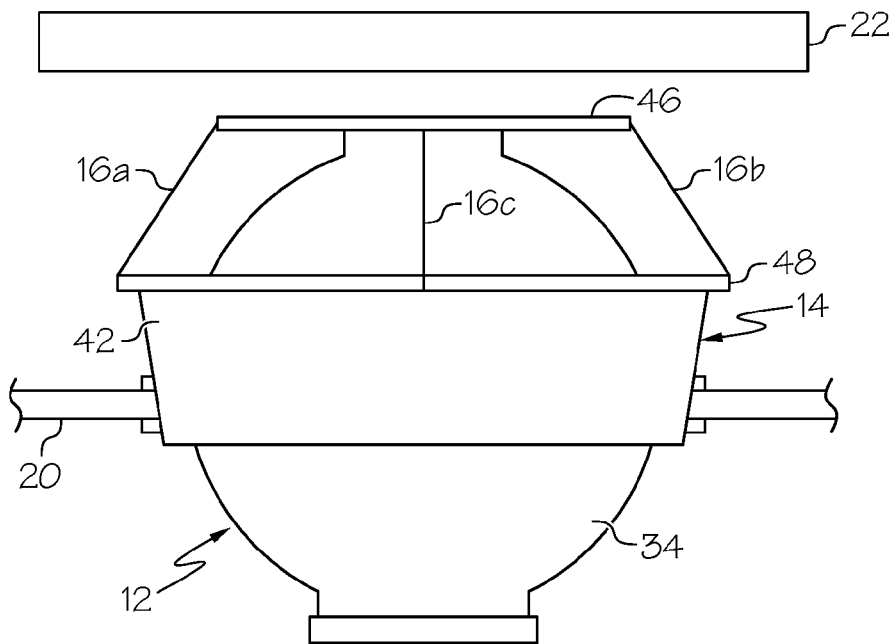
FIG. 7 is a side schematic view of the disclosed direction controlled service apparatus, depicted in a first position.
Figure 8:
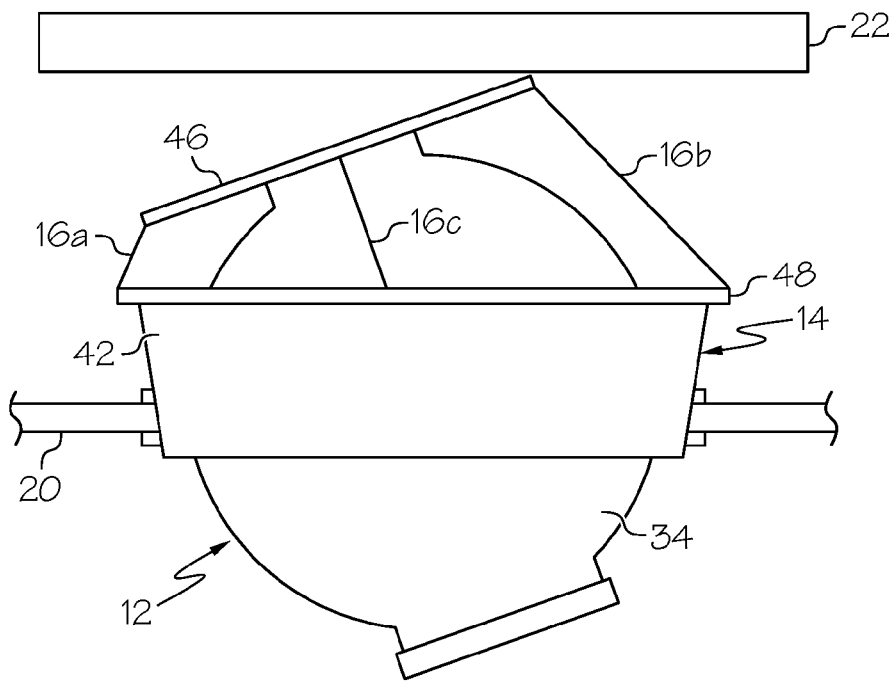
FIG. 8 is a side schematic view of the disclosed direction controlled service apparatus, depicted in a second position.

Referring to FIGS. 7 and 8, the housing assembly 12 may be rotated with respect to the mounting assembly 14 from a first, non-rotated position (FIG. 7) to a second, rotated position (FIG. 8). In the first position, each actuator 16a, 16b, 16c, 16d (FIG. 4) of the plurality of actuators 16 may be in a deformed (e.g., elongated) state interconnected between the first ring 46 and the second ring 48. A first actuator 16a may contract in response to the applied current and transition to its original, undeformed, state, thus pulling the first ring 46 toward the second ring 48 and rotating the housing assembly 12 with respect to the mounting assembly 14 to the second position.

When an SMA part, such as the SMA wire, is deformed within the recoverable range of strain below its martensite finish temperature ($M_f$), and then heated to above the austenite finish temperature ($A_f$), it will revert to its original undeformed shape or length. However, re-cooling of the element below the $M_f$ temperature again may not cause reversion to the deformed shape spontaneously, thus the shape memory effect may be a one-way effect. Therefore, a stress, or bias, may need to be applied to the SMA wire for it to revert to the deformed shape as it re-cools below the $M_f$ temperature.

Referring still to FIGS. 7 and 8, a bias may be applied to the first actuator 16a to cause reversion to the deformed martensitic state as the SMA wire actuator 16a cools below the $M_f$ temperature. This bias may be applied by the opposing second actuator 16b. The opposed second actuator 16b may offer greater force availability, since the first actuator 16a, when unheated (e.g., when current is removed), may require minimal force to move back to the deformed (e.g., elongated) state.

Figure 9:
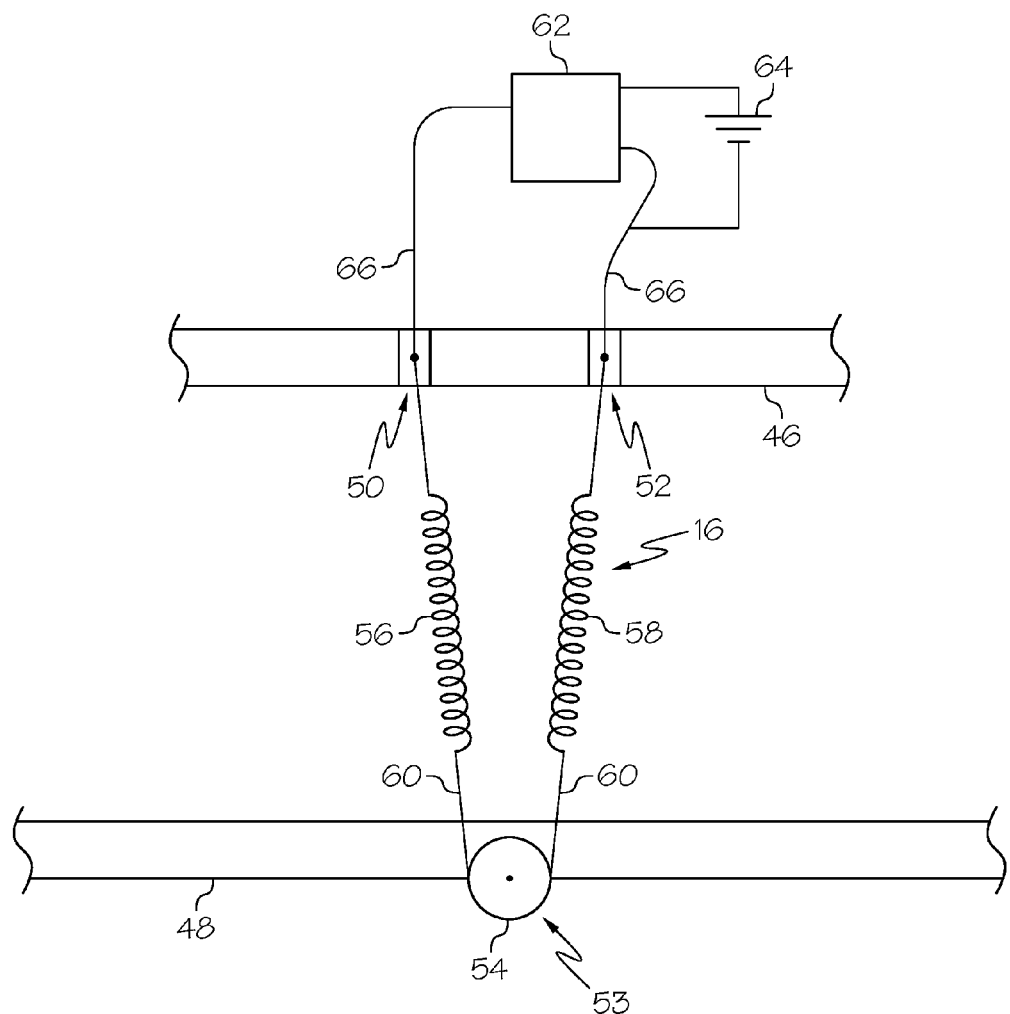
FIG. 9 is a side schematic view of the disclosed direction controlled service apparatus, illustrating the actuator and current generating circuit.

Referring to FIG. 9, in certain implementations of the disclosed direction controlled service apparatus 10, the actuators 16 may be SMA wire coils. The length of contraction of the actuator 16 is related to the overall length of the SMA wire. Thus, use of coiled SMA wire actuators 16 may increase the stroke delivered by the actuator 16. In order to compensate for any decrease the available force, the thickness of the wire may be increased.

Each of the plurality of actuators 16 may include a first end 50 and an opposed second end 52. In one implementation, the first end 50 and second end 52 of each actuator 16 may be connected to the first ring 46 and an intermediate (e.g., middle) location 53 of the actuator 16 may be looped around a wire pulley 54 rotatably connected to the second ring 48. For example, the actuator 16 may include a first coiled section 56 and a second coiled section 58 separated by an uncoiled section 60. The first coiled section 56 may extend from proximate the first end 50 to the uncoiled section 60 and the second coiled section 58 may extend from proximate the second end 52 to the uncoiled section 60. The uncoiled section 60 may be looped around the pulley 54.

The actuator 16 may be positioned such that its dimensional change will result in movement of the housing assembly 12 with respect to the mounting assembly 14. The SMA actuator 16 may be sufficiently dimensioned such that when the actuator 16 is heated (e.g., a current is applied) so as to induce phase transition and associated change in length, the actuator 16 will pull on the first ring 46 and move the housing assembly 12 with respect to the mounting assembly 14 in one, generally uninterrupted motion.

Figure 17:
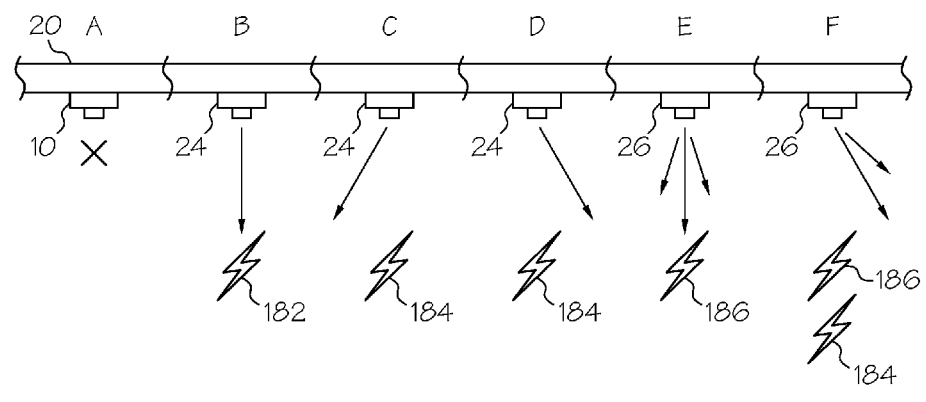
FIG. 17 is a schematic illustration showing various functional states and positions of the disclosed direction controlled service apparatus.

A current generating circuit 62 may include an electric power source 64 and an electrical connection 66 connecting the electric power source 64 to both ends 50, 52 of the actuator 16. The current generating circuit 62 may be situated along the electrical connection 66 such that pulses of electricity from the electric power source 64 may be applied to the actuator 16 in response to an actuation signal 184 (FIG. 17). The current generating circuit 62 may be arranged on the control board 22 (FIG. 1) or may be integrated within the housing assembly 12 or mounting assembly 14 and electrically connected to the control board 22.

In another implementation of the disclosed direction controlled service apparatus 10, the actuator 16 may be an uncoiled length of SMA wire or may include a single coiled section extending from proximate the first end 50 to proximate the second end 52. The first end 50 may be connected to the first ring 46 and the second end 52 may be connected to the second ring 48.

Referring to FIGS. 4, 7, and 8, it can be appreciated that motion of the housing assembly 12 with respect to mounting assembly 14 may be limited only by the number of actuators 16 or by the number of actuators 16 to which current is applied. For example, if current is applied only to the first actuator 16a (only the first actuator 16a contracts), the housing assembly 12 will rotate to the second position (FIG. 8) with respect to the mounting assembly 14. As another example, if current is applied only to the third actuator 16c (only the third actuator 16c contracts) the housing assembly 12 will rotate to a third position (not shown) with respect to the mounting assembly 14. As another example, if current is applied to the first actuator 16a and the adjacent third actuator 16c (both the first actuator 16a and the third actuator 16c contact), the housing assembly 12 will rotate to a fourth position (not shown) with respect to the mounting assembly 14. The fourth position may be between the second and third positions.

In an embodiment of the disclosed direction controlled service apparatus 10, the socket housing 42 of the mounting assembly 14 may be dimensioned in close tolerance with the ball-shaped housing 34 of the housing assembly 12, such that the housing assembly 12 is secured in any one of a plurality of fixed positions with respect to the mounting assembly 14 by friction. In such an embodiment, the force generated by any one of the plurality of actuators 16 may be sufficient to overcome the friction force retaining the housing assembly 12 in the fixed position and rotate the housing assembly 12 with respect to the mounting assembly 14.

Figure 10:
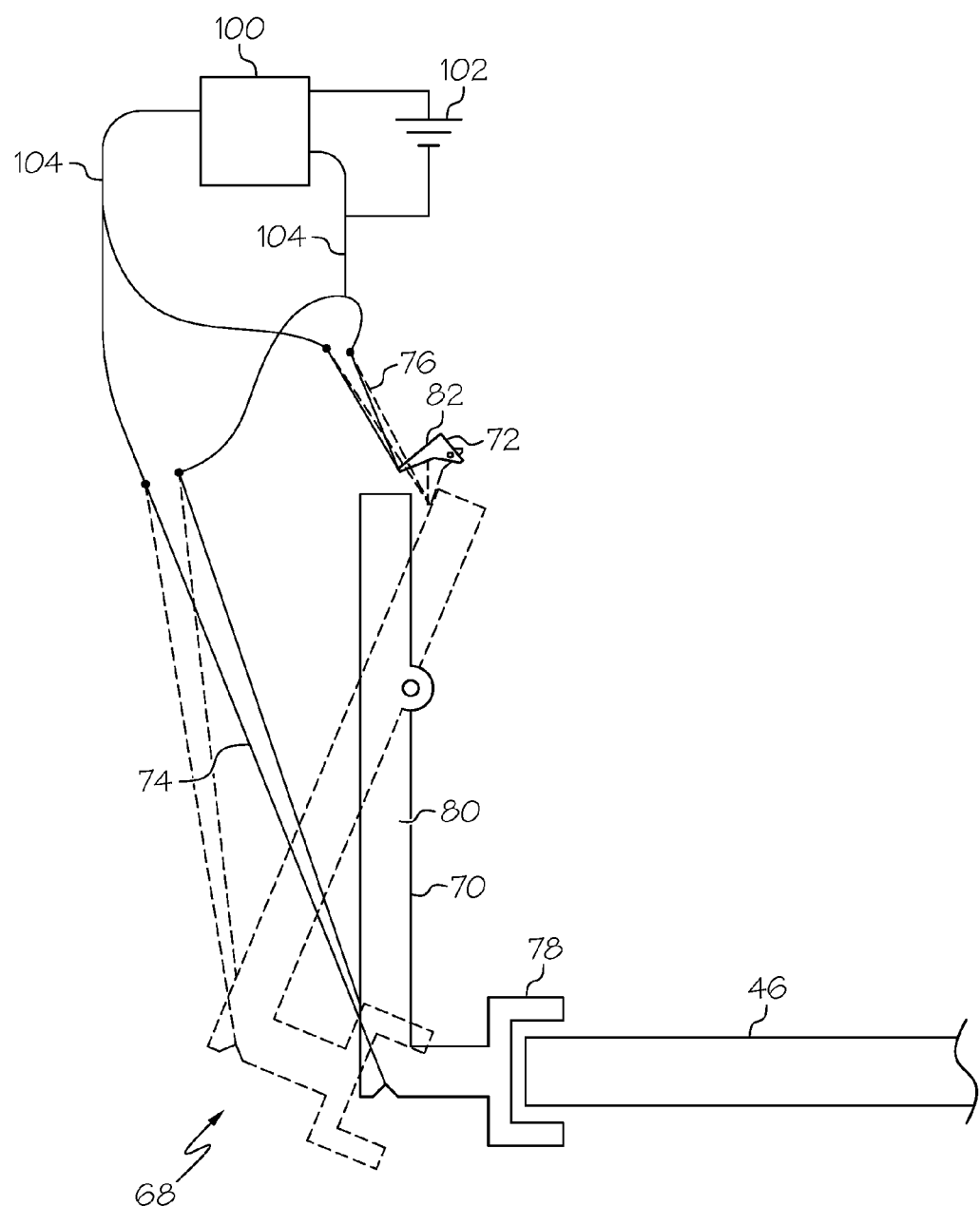
FIG. 10 is a side schematic view of an implementation of the latching mechanism of the disclosed direction controlled service apparatus.
Figure 11:
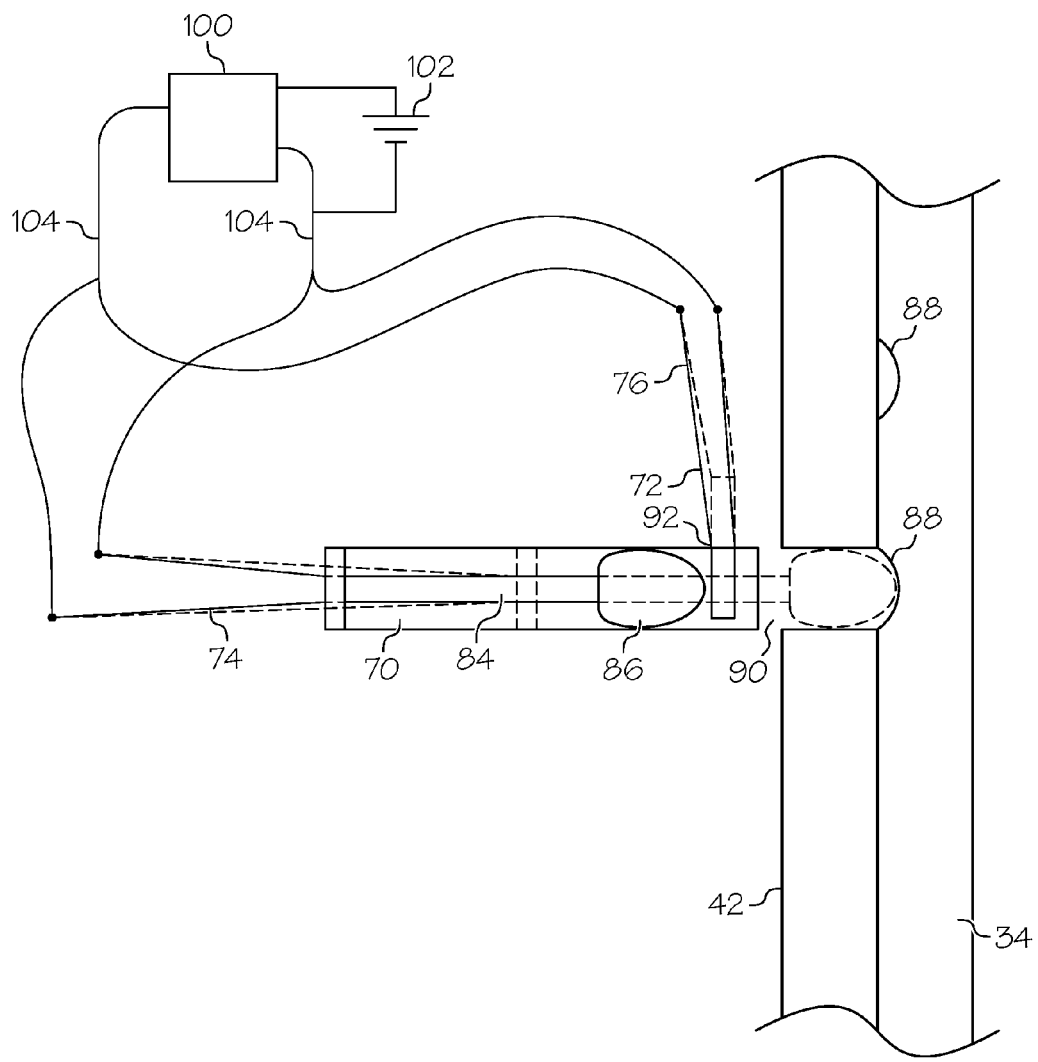
FIG. 11 is a side schematic view of another implementation of the latching mechanism of the disclosed direction controlled service apparatus.

Referring to FIGS. 10 and 11, in other embodiments, the disclosed direction controlled service apparatus 10 may include at least one latching mechanism 68 to secure the housing assembly 12 in a fixed position with respect to the mounting assembly 14. The latching mechanism 68 may include a latch 70 and a latch release 72. The latch 70 may be movable with respect to the housing assembly 12 between an open configuration and a closed configuration. The latch 70 may operably engage the housing assembly 12 when in the closed configuration to secure the housing assembly 12 in a fixed position with respect to the mounting assembly 14. The latch 70 may be biased in the closed configuration by a biasing element, such as a spring, operably connected to the latch 70 and my urge the latch 70 to the closed configuration. A latch actuator 74 may be operably connected to the latch 70 and configured to move the latch 74 to the open position in response to an applied current. The latch actuator 74 may be an SMA wire substantially similar to the SMA wire described above for the plurality of actuators 16.

The latch release 72 may be movable with respect to the latch 70 between an engaged configuration and a disengaged configuration. The latch release 72 may be operably engaged with the latch 70 when in the engaged configuration to secure the latch 70 in the open configuration with respect to the housing assembly 12. The latch release may be biased in the engaged configuration by a biasing element, such as a spring, operably connected to the latch release 72 and may urge the latch release 72 to the engaged configuration. A latch release actuator 76 may be operably connected to latch release 72 and configured to move the latch release 72 to the disengaged configuration in response to an applied current. The latch release actuator 76 may be an SMA wire substantially similar to the SMA wire described above for the plurality of actuators 16.

At least one current generating circuit 100 may include an electric power source 102 and an electrical connection 104 connecting the electric power source 102 to both ends of the latch actuator 74 and the latch release actuator 76. The current generating circuit 100 may be situated along the electrical connection 104 such that pulses of electricity from the electric power source 102 may be applied to the latch actuator 74 and the latch release actuator 76 in response to an actuation signal 184 (FIG. 17). The current generating circuit 100 may be arranged on the control board 22 (FIG. 1) or may be integrated within the housing assembly 12 or mounting assembly 14 and electrically connected to the control board 22. In one example, a single current generating circuit 100 may be used to transmit the electrical current to both the latch actuator 74 and the latch release actuator 76. In another example, two current generating circuits 100 may be provided, each of the current generating circuits 100 being electrically connected to one of the latch actuator 74 or the latch release actuator 76. In another example, the latch actuator 74 or the latch release actuator 76 may be electrically connected to the current generating circuit 62 along with the plurality of actuators 16 (FIG. 9) as previously described.

As illustrated in FIG. 10, in one example implementation of the latching mechanism 68 of the disclosed direction controlled service apparatus 10, a plurality of latching mechanisms 68 may be positioned about the first ring 46 of the housing assembly 12. The latch 70 may be a lever member 80 pivotably connected to a housing or post adjacent to the ball-shaped housing 34. As one example, the lever member 80 of the latch 70 may be pivotably connected at a fulcrum by a pin. The lever member 80 of the latch 70 may engage the ball-shaped housing 34, for example at the first ring 46, when in the closed configuration. The lever member 80 may include a first end having an engagement feature 78 configured to securely engage the ball-shaped housing 34. For example, the engagement feature 78 may be configured to securely engage a peripheral rim of the first ring 46, such as a C-shaped clamp. As another example, engagement feature 78 may be configured to be received by the peripheral rim of the first ring 46, such as a pin. Other types of engagement features 78 configured to securely engage the housing assembly 12 at other locations is also contemplated.

The latch release 72 may be another lever member 82 movably connected to the housing or post adjacent to the ball-shaped housing 34. As one example, the lever member 82 of the latch release 72 may be pivotably connected at a fulcrum by a pin. As another example, the lever member 82 of the latch release 72 may be slidably connected along a track. The latch release 72 may engage an opposed second end of the lever member 80 of the latch 70 to secure the latch 70 is in the open configuration.

In a normal state, the lever member 80 of the latch 70 may be in the open configuration and the lever member 82 of the latch release 72 may be in the engaged configuration securing the latch 70 in the open configuration. When the housing assembly 12 is rotated to a rotated position with respect to the mounting assembly 14 (e.g., by one or more of the actuators 16), a current may be applied to the latch release actuator 76 to contract the latch release actuator 76 (transition the latch release actuator 76 back to its non-deformed state) and move the lever member 82 of the latch release 72 to the disengaged configuration releasing the lever member 80 of the latch 70. The biasing element may urge the lever member 80 of the latch 70 to the closed configuration, such that the engagement feature 78 securely engages the ball-shaped housing 34 in the fixed rotated position with respect to the socket housing 42. Upon a current being applied to the latch actuator 74, the latch actuator 74 may contract (transition the latch actuator 74 back to its non-deformed state) and move the lever member 80 of the latch 70 to the open configuration. The biasing element of the latch release 72 may urge the lever member 82 of the latch release 72 back to the engaged configuration to retain the lever member 80 of the latch 70 in the open configuration.

It can be appreciated that the secured position of the housing assembly 12 with respect to the mounting assembly 14 may be limited only by the number of latching mechanisms 68. For example, four latching mechanisms 68 may secure the housing assembly 12 in four distinct fixed positions relative to the mounting assembly 14. Additional latching mechanisms 68 may provide for additional secured positions.

As illustrated in FIG. 11, in another example implementation of the latching mechanism 68 of the disclosed direction controlled service apparatus 10, a plurality of latching mechanisms 68 may be positioned about the ball-shaped housing 34 of the housing assembly 12 and the socket housing 42 of the mounting assembly 14. The latch 72 may be a plunger member 84 slidably connected within a housing positioned adjacently to the ball-shaped housing 34. As one example, the plunger member 84 of the latch 72 may be spring loaded and movable within a tubular housing. The plunger member 84 of the latch 70 may engage the ball-shaped housing 34 when in the closed configuration. The plunger member 84 may include a first end having an engagement feature 86 configured to securely engage the ball-shaped housing 34. For example, the engagement feature 86 may be a detent configured to be securely received within a recess 88 of the ball-shaped housing 34. The ball-shaped housing 34 may include a plurality of recesses 88 positioned upon the outer circumferential surface. The position of each of the recesses 88 may correspond to a fixed rotated position of the housing member 12 with respect to the mounting member 14.

For example, the plunger member 84 may be positioned outside of the socket housing 42 and the socket housing 42 may include a plurality of through-hole apertures 90 configured to allow the engagement feature 86 (e.g., the detent) to pass through the socket housing 42 and engage an aligned recess 88 in the ball-shaped housing 34. As another example, the plunger member 84 may be positioned outside of the ball-shaped housing 34 and engage a proximate recess 88 in the ball-shaped housing 34. Other types of engagement features 86 configured to securely engage the housing assembly 12 at other locations is also contemplated.

The latch release 72 may be a pin 92 movably connected to the tubular housing adjacent to the engagement feature 86. As one example, the pin 92 of the latch release 72 may be spring loaded and movable within a tubular housing. The pin 92 of the latch release 72 may engage an end of the engagement feature 86 of the latch 70 to secure the latch 70 is in the open configuration.

In a normal state, the plunger member 84 of the latch 70 may be in the open configuration and the pin 92 of the latch release 72 may be in the engaged configuration securing the latch 70 in the open configuration. When the housing assembly 12 is rotated to a rotated position with respect to the mounting assembly 14 (e.g., by one or more of the actuators 16), a current may be applied to the latch release actuator 76 to contract the latch release actuator 76 (transition the latch release actuator 76 back to its non-deformed state) and move the pin 92 of the latch release 72 to the disengaged configuration releasing the plunger member 84 of the latch 70. The biasing element may urge the plunger member 84 of the latch 70 to the closed configuration, such that the engagement feature 78 is receivably engaged within the recess 88 of the ball-shaped housing 34 aligned with the aperture 90 of the socket housing 42 to secure the ball-shaped housing 34 in the fixed rotated position with respect to the socket housing 42. Upon a current being applied to the latch actuator 74, the latch actuator 74 may contract (transition the latch actuator 74 back to its non-deformed state) and move the plunger member 84 of the latch 70 to the open configuration. The biasing element of the latch release 72 may urge the pin 92 of the back to the engaged configuration to retain the plunger member 84 of the latch 70 in the open configuration.

Alternatively, the latching mechanism 68 may not include the latch release 72. In such an embodiment, the plunger member 84 may be retained in the open configuration by contact with the outer circumferential surface of the ball-shaped housing 34.

The SMA wire of the latch actuator 74 and the latch release actuator 76 may be configured to provide sufficient force to overcome the biasing force provided by the biasing elements of the latch 70 and latch release 72, respectively, upon application of current. The biasing force provided by the biasing elements of the latch 70 and the latch release 72 may be configured to return the latch actuator 74 and the latch release actuator 76, respectively, to their deformed (e.g., extended) state.

It can be appreciated that the secured position of the housing assembly 12 with respect to the mounting assembly 14 may be limited only by the number of latching mechanisms 68 and the number of recesses 88 disposed in the ball-shaped housing 34. For example, four latching mechanisms 68 and four recesses 88 may secure the housing assembly 12 in four distinct fixed positions relative to the mounting assembly 14. Additional latching mechanisms 68 and recesses 88 may provide for additional secured positions.

Figure 12:
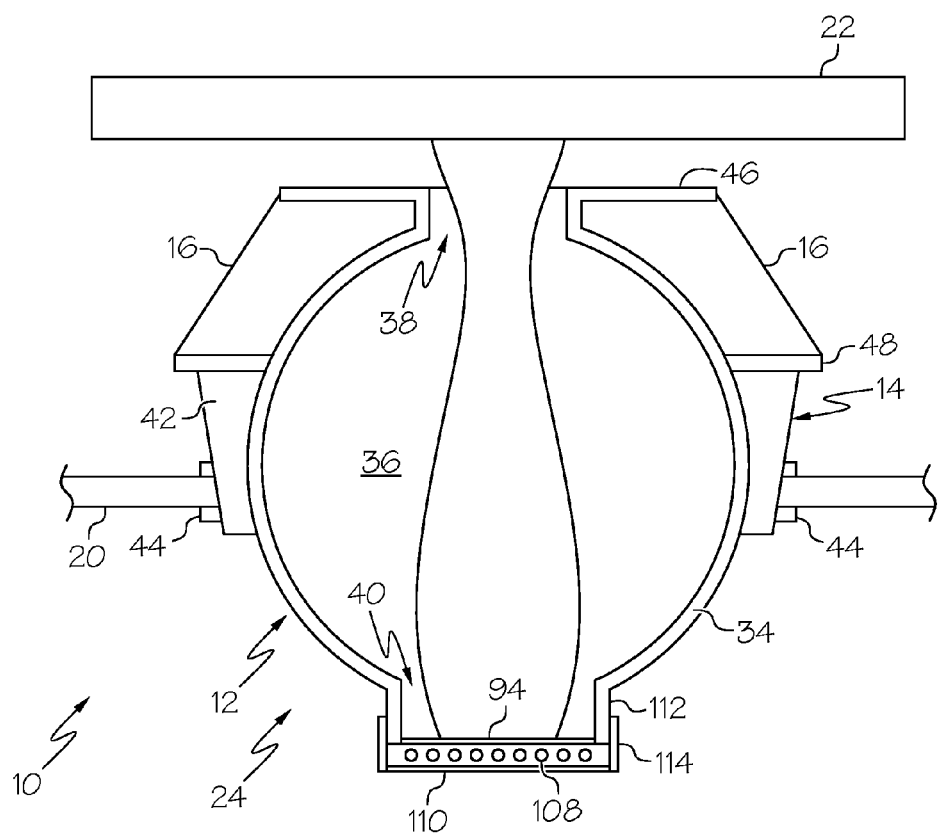
FIG. 12 is a side sectional view of an implementation of the disclosed direction controlled service apparatus.

Referring to FIG. 12, in an implementation, the disclosed direction controlled service apparatus 10 may be configured for use as a reading light 24 (FIG. 2). The housing assembly 12 may include a light-emitting diode (LED) module 94 housed within the lower end of the ball-shaped housing 34. The LED module 94 may include a generally circular shape suitably sized to fit within the second opening 40 of the ball-shaped housing 34. An electrical circuit may be formed by connecting the LED module 94 and the power source. For example, the LED module 94 may include an electrical connection extending through the interior space 36 of the ball-shaped housing 34 for connection to the electric power source. Alternatively, the LED module 94 may include a plurality of electrical connections or terminals for operable contact with a plurality of complimentary electrical connections or terminals disposed around the peripheral rim of the second opening 40.

The LED module 94 may include, or house, a plurality of light-emitting diodes (LEDs) 108. The LEDs 108 may be arranged in any pattern upon the LED module 94. The LED module 94 may be connected to the control board 22, which may include a switch module for illuminating the LEDs 108 upon transmission of an activation signal 182 (FIG. 17). Optionally, the housing assembly 12 may include a reflector (not shown) disposed behind the plurality of LEDs 108. A lens 110 may be connected over the second opening 40. For example, the lower end of the ball-shaped housing 34 may include a downwardly extending annular lip 112. The lip 112 may include threading on an exterior surface. A collar 114 may house the lens 110 and include a continuous sidewall. The sidewall may include threading disposed on an interior surface for connection to the lip 112.

Figure 13:
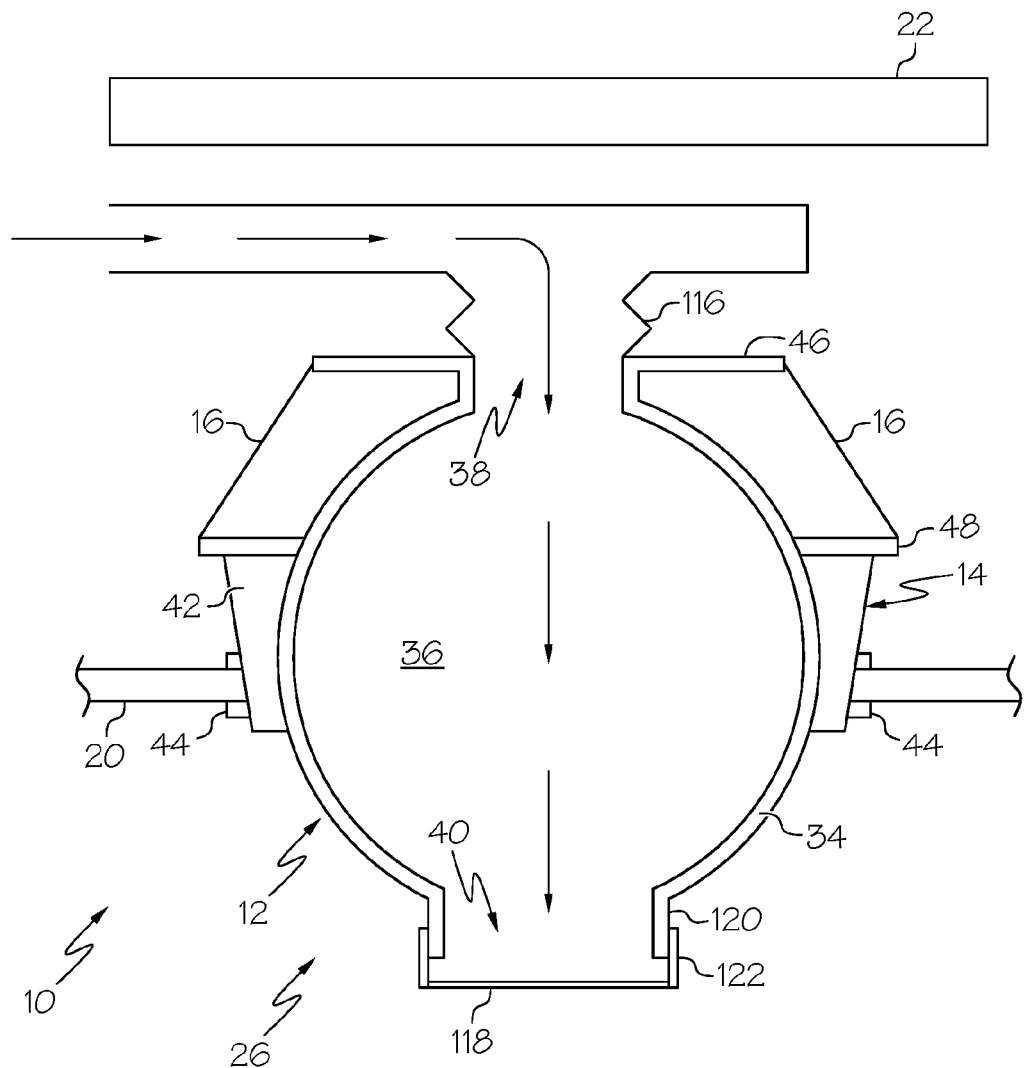
FIG. 13 is a side sectional view of another implementation of the disclosed direction controlled service apparatus.

Referring to FIG. 13, in another implementation, the disclosed direction controlled service apparatus 10 may be configured for use as a personal air unit 26 (FIG. 2), such as a gasper. The housing assembly 12 may include a conduit connector 116 extending from the ball-shaped housing 34 configured to connect to an air source (e.g., a duct in the low pressure low volume air system contained within the PSU 18 (FIG. 2) or the cabin ceiling of the aircraft). For example, the connector 116 may be a flexible conduit connector to allow for rotating motion of the housing assembly 12. An air flow (denoted by arrow) may be provided from the air source (not shown) through the interior space 36 of the ball-shaped housing 34 from the first opening 38 to the second opening 40.

The housing assembly 12 may also include a shutter assembly 118 connected to the lower end of the ball-shaped housing 34 about the second opening 40 to adjust the air flow from personal air unit 26 between no air output and a fairly substantial air output. For example, the lower end of the ball-shaped housing 34 may include a downwardly extending annular lip 120. The lip 120 may include threading on an exterior surface. The shutter assembly 118 may include a collar 122 having a continuous sidewall. The sidewall may include threading disposed on an interior surface for connection to the lip 120.

Figure 14:
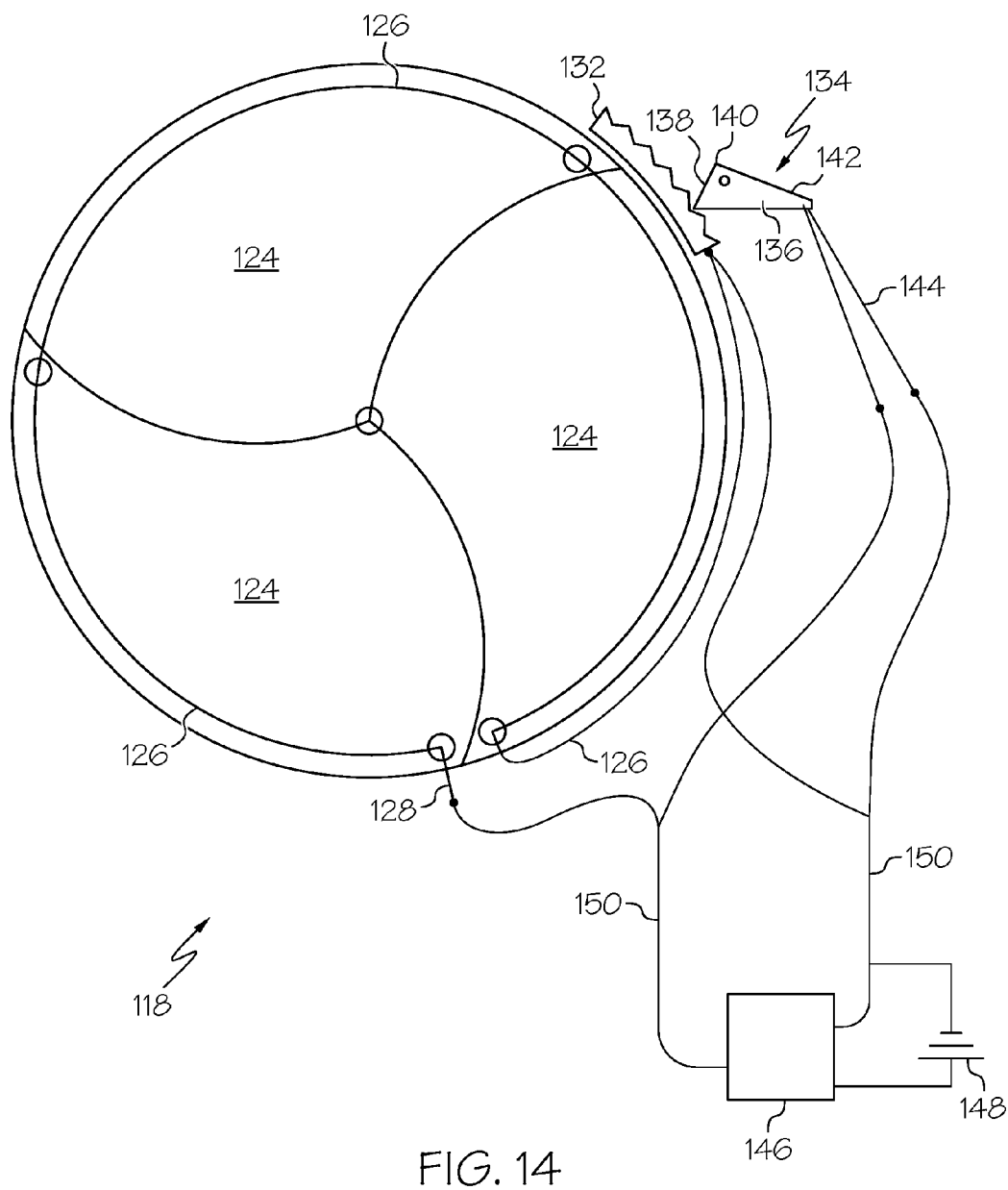
FIG. 14 is a schematic view of an implementation of the shutter assembly of the disclosed direction controlled service apparatus of FIG. 13.

Referring to FIG. 14, in one implementation, the shutter assembly 118 may include a plurality of blades 124. The plurality of blades 124 may be positioned adjacent to (e.g., below) the second opening 40, for example, by connecting the shutter assembly 118 to the lower end of the ball-shaped housing 34 about the second opening 40. While only three (3) blades 124 are shown by illustration, it can be appreciated that any number of blades 124 may be used. Each of the blades 124 may be pivotably connected to one another, such that each blade 124 may be successively rotated upon an adjacent blade 124 in order to expose a larger portion of the second opening 40 of the ball-shaped housing 34 (FIG. 13), thus providing for a greater air flow.

A blade actuator 126 may be connected to each of the blades 124 and at least partially circumscribe the second opening 40. For example, the blade actuator 126 may extend along a path provided by the collar 122, such as an integral groove or through-hole. The blade actuator 126 may be configured to contract in response to an applied electrical current and rotate the blades 124 with respect to one another. The blade actuator 126 may be an SMA wire substantially similar to the SMA actuators described herein.

The blade actuator 126 may have a first end 128 at a fixed location, for example fixed to the collar 122 (FIG. 13). A second end 130 of the blade actuator 126 may be connected to a toothed rack 132. The rack 132 may be movable in opposing directions. For example, the rack 132 may be movable along a track (not shown) on the collar 122. Upon application of current, the blade actuator 126 may contract (e.g., shorten), thus drawing the blades 124 in upon themselves and moving the rack 132. It can be appreciated that the change in length of the blade actuator 126 may be determined by the energy (e.g., electrical current) applied, as discussed above (FIGS. 5 and 6).

A locking mechanism 134 may be positioned adjacent to the rack 132. The locking mechanism 134 may include a lever member 136 pivotably connected to a support, such as the collar 122. The lever member 136 of the locking mechanism 134 may be movable with respect to the rack 132 between an engaged configuration and a disengaged configuration. A first end 140 of the lever member 136 may include an engagement feature 138 configured to operably engage the rack 132 and secure the rack 132 in a fixed position, when the lever member 136 is in the engaged configuration. For example, the engagement feature 138 may be a detent configured to be received within a gap formed between adjacent teeth of the rack 132.

The teeth of the rack 132 may be configured such that the lever member 136 of the locking mechanism 134 may restrict movement of the rack 132 in opposing directions when in the engaged configuration. For example, the rack 132 may include two sets of opposing teeth, such that the engagement feature 138 of the lever member 136 may engage a tooth of the first set of teeth to restrict movement in one direction and engage a tooth of the opposing second set of teeth to restrict movement in the opposite direction.

The rack 132 may be biased to a position corresponding to a fully closed position of the plurality of blades 124 by a biasing element. The biasing element may be a spring or an apposing SMA actuator configured to contract in response to an applied current.

The locking mechanism 134 may be biased in the engaged configuration by a biasing element, such as a spring, operably connected to the lever member 136 and may urge the lever member 136 to the engaged configuration. A locking mechanism actuator 144 may be operably connected to a second end 142 of the lever member 136 and configured to move the locking mechanism 134 to the disengaged position in response to an applied current. The locking member actuator 144 may be an SMA wire substantially similar to the SMA wire described above.

Upon actuation (e.g., contraction) of the locking mechanism actuator 144, the lever member 136 may move to the disengaged position, thus allowing the biasing element to return the rack 132 toward the position corresponding to a fully closed position of the plurality of blades 124 and returning the blade actuator 126 to its deformed (e.g., elongated) state.

The locking mechanism actuator 144 may be configured to hold the lever member 136 in the disengaged position only long enough for the rack 132 to move toward the position corresponding to a fully closed position of the plurality of blades 124 (e.g., via the biasing element) or away from the position corresponding to a fully closed position of the plurality of blades 124 (e.g., via the blade actuator 126) incrementally. The biasing element of the locking mechanism 134 may return the lever member 136 to the engaged configuration and return the locking mechanism actuator 144 to its deformed (e.g., elongated) state. In such a manner, the relative position of the blades 124 may be incrementally adjusted to adjust the air flow through the second opening 40.

At least one current generating circuit 146 may include an electric power source 148 and an electrical connection 150 connecting the electric power source 148 to both ends of the blade actuator 126 and the locking mechanism actuator 144. The current generating circuit 146 may be situated along the electrical connection 150 such that pulses of electricity from the electric power source 148 may be applied to the blade actuator 126 and the locking mechanism actuator 144 in response to an air flow control signal 186 (FIG. 17). The current generating circuit 146 may be arranged on the control board 22 or may be integrated within the housing assembly 12 or mounting assembly 14 and electrically connected to the control board 22. In one example, a single current generating circuit 146 may be used to transmit the electrical current to both the blade actuator 126 and the locking mechanism actuator 144. In another example, two current generating circuits 146 may be provided, each of the current generating circuits 146 being electrically connected to one of the blade actuator 126 or the locking mechanism actuator 144. In another example, the blade actuator 126 and the locking mechanism actuator 144 may be electrically connected to the current generating circuit 62 along with the plurality of actuators 16 (FIG. 9) as previously described.

Figure 15:
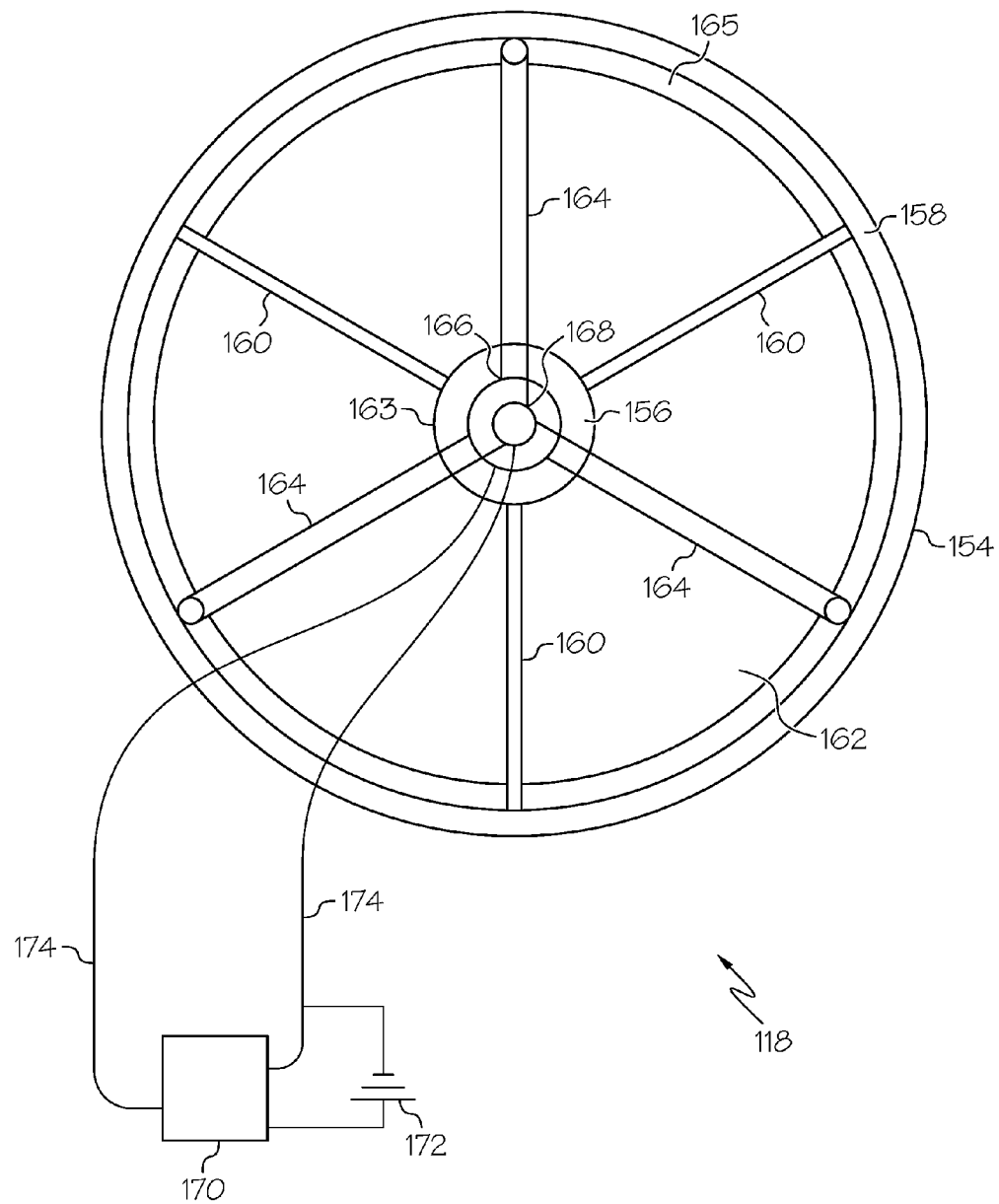
FIG. 15 is a schematic view of another implementation of the shutter assembly of the disclosed direction controlled service apparatus of FIG. 13.

Referring to FIG. 15, in another implementation, the shutter assembly 118 may include a rigid frame 154 and a flexible diaphragm 162. The frame 154 and diaphragm 162 may be positioned adjacent to (e.g., below) the second opening 40 of the ball-shaped housing 34, for example, by connecting the shutter assembly 118 to the lower end of the ball-shaped housing 34 about the second opening 40.

The frame 154 may include a central hub 156, an outer perimeter frame member 158, and plurality of radial frame members 160 extending radially from the hub 156 to the perimeter frame member 158. The perimeter frame member 156 may be connected to the interior of the collar 122 (FIG. 13). The diaphragm 162 may include a central region 163 (e.g., a middle area) and a perimeter 165. The central region 163 of the diaphragm 162 may be connected to the central hub 156 of the frame 154. The diaphragm 162 may be a thin sheet of flexible material (e.g., rubber) forming a partition or barrier to the air flow exiting through the second opening 40 of the ball-shaped housing 34. The diaphragm 162 may be configured to completely cover the second opening 40 when in a fully expanded position and at least partially expose the second opening 40 when in a partially or fully contracted position. The perimeter 165 of the diaphragm 162 may be located proximate the perimeter frame member 158 of the frame 154 when the diaphragm 162 is in the fully expanded position.

A plurality of diaphragm actuators 164 may be connected between the hub 156 and a perimeter of the diaphragm 162. The plurality of diaphragm actuators 164 may be spaced along the perimeter 165 of the diaphragm 162. The diaphragm actuators 164 may be configured to contract in response to an applied electrical current and pull the perimeter 165 of the diaphragm 162 toward the hub 154 placing the diaphragm 162 in at least a partially contracted position. The diaphragm actuators 164 may be an SMA wire substantially similar to the SMA actuators described herein.

For example, each of the diaphragm actuators 164 may include a first end 166 and an opposed second end 168. Both ends 166, 168 of the diaphragm actuator 164 may be connected to the hub 156 and an intermediate (e.g., middle) location of the diaphragm actuator 164 may be looped through or otherwise connected to the perimeter 165 of the diaphragm 162. The diaphragm 162 may be biased in the fully expanded position to entirely cover the second opening 40. Upon application of current, the diaphragm actuators 164 may contract (e.g., shorten), thus drawing the perimeter 165 of the diaphragm 162 inward toward the hub 156. Thus, the position of the perimeter 165 of the diaphragm 162 with respect to the perimeter frame member 158 may be adjustable to control the air flow exiting from the second opening 40. It can be appreciated that the change in length of the diaphragm actuators 164 may be determined by the energy (e.g., electrical current) applied, as discussed above (FIGS. 5 and 6), and thus contracted position of the diaphragm 162 (e.g., position of the perimeter 165 of the diaphragm 162 with respect to the perimeter frame 158 of the frame 154.

A diaphragm retaining mechanism may be provided to retain the perimeter of the diaphragm 162 in a contracted position with respect to the perimeter frame member 158. The diaphragm retaining mechanism may include a latch having a latch actuator and a latch release having a latch release actuator similar to those described herein.

At least one current generating circuit 170 may include an electric power source 172 and an electrical connection 174 connecting the electric power source 172 to both ends 166, 168 of each of the plurality of diaphragm actuators 164. The current generating circuit 170 may be situated along the electrical connection 174 such that pulses of electricity from the electric power source 172 may be applied to all of the diaphragm actuators 164 in response to an air flow control signal 186 (FIG. 17). The current generating circuit 170 may be arranged on the control board 22 or may be integrated within the housing assembly 12 or mounting assembly 14 and electrically connected to the control board 22. Alternatively, the diaphragm actuators 164 may be electrically connected to the current generating circuit 62 along with the plurality of actuators 16 (FIG. 9) as previously described.

In another implementation, the disclosed direction controlled service apparatus 10 may be configured for use as both a reading light 24 and a personal air outlet 26 (FIG. 2). For example, the LED module 94 (FIG. 12) may include a ring shape having a plurality of LEDs 108. The ring-shaped LED module may be connected to the lower end of the ball-shaped housing 34 outside of and around the perimeter of the second opening 40. The shutter assembly 118 (FIG. 13) may be connected to the lower end of the ball-shaped housing 34 over the second opening 40 (e.g., within the ring-shaped LED module).

Figure 16:
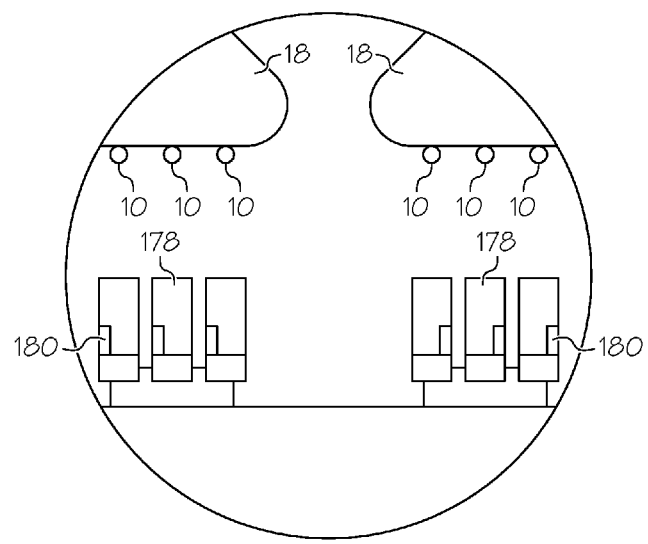
FIG. 16 is a schematic view of the aircraft passenger service unit of FIG. 2.

Referring to FIG. 16, the passenger service unit 18 may be positioned in the cabin of an aircraft and with respect to a seat group. FIG. 16 represents a plurality of direction controlled service apparatus 10 utilized with and connected to the service panel 20. It can be appreciated that the direction controlled service apparatus 10 shown can be either a reading light 24 (FIG. 12) or a personal air outlet 26 (FIG. 13).

The direction controlled service apparatus 10 may be arranged directly above a corresponding passenger seat 178. Each seat 178 may include a control unit 180. The control unit 180 may be configured to communicate with the direction controlled service apparatus 10 corresponding to the seat 178. For example, the control unit 180 may communicate with the control board 22 of the PSU 18 to control the function and position of the corresponding direction controlled service apparatus 10. For example, the control unit 180 may transmit a signal to control the position and function of the direction controlled service apparatus 10 corresponding to the seat 178.

FIG. 17 shows various different positions and functions of the direction controlled service apparatus 10. Under heading "A" of FIG. 17, the direction controlled service apparatus 10 may initially be OFF (e.g., no illumination or air flow being distributed from the apparatus 10) and positioned in a first position (FIG. 7). Under heading "B" of FIG. 17, the direction controlled service apparatus 10 may be utilized as a reading light 24 (FIG. 12). In response to an activation signal 182 transmitted by the control unit 180, the LED module 94 (FIG. 12) may be energized and transmit illumination (denoted by the arrow) directed toward the corresponding seat 178. Under heading "C" of FIG. 17, in response to an actuation signal 184 transmitted by the control unit 180, the housing assembly 12 (FIG. 1) may rotate to a second position (FIG. 8) with respect to the mounting assembly 14 and also with respect to the corresponding seat 178. Under heading "D" of FIG. 17, in response to another actuation signal 184 transmitted by the control unit 180, the housing assembly 12 may rotate to a third position position with respect to the mounting assembly 14 and also with respect to the corresponding seat 178.

Under heading "E" of FIG. 17, the direction controlled service apparatus 10 may be utilized as a personal air outlet 26 (FIG. 13). In response to an air flow control signal 186 transmitted by the control unit 180, the shutter assembly 118 (FIG. 13) may open allowing an air flow (denoted by the plurality of arrows) directed toward the corresponding seat 178. Under heading "F" of FIG. 17, in response to another air flow control signal 186 from the control unit 180 the amount of air flow from the personal air outlet 26 may be restricted by partially closing the shutter assembly 118. In response to an actuation signal 184 transmitted by the control unit 180, the housing assembly 12 may rotate to a second position with respect to the mounting assembly 14 and also with respect to the corresponding seat 178.

The various signals transmitted to the control board 22 from the control unit 180 may be wired or wireless signals. In a wired embodiment, electrical connections may be routed from the control unit 180 of each seat 178 through the body of the cabin and to the control board 22 of the PSU 18. In a wireless embodiment, the control unit 180 may include a wireless transmitter configured to transmit a wireless signal (e.g., radio frequency). The control board 22 may include a wireless receiver configured to receive the wireless signal transmitted by the control unit 180. The control board 22 may also include a processing module configured to process the wireless signal and provide a control signal to the direction controlled service apparatus 10, for example, controlling the position of the housing assembly 12 with respect to the mounting assembly 14, energizing/de-energizing the LED module 94, or opening/closing the shutter assembly 118.

Accordingly, the disclosed direction controlled service apparatus may provide a seat level control for passengers of an aircraft that provides service function control of the passenger service unit corresponding to their seat.

Although various aspects of the disclosed direction controlled service apparatus have been shown and described, modifications may occur to those skilled in the art upon reading the specification. The present application includes such modifications and is limited only by the scope of the claims.

The invention claimed is:
1. A shutter assembly for controlling an air flow of a direction controlled service apparatus, said shutter assembly comprising;
   a collar configured to connect to an opening in a housing assembly of said direction controlled service apparatus;
   a plurality of blades disposed within said collar, said plurality of blades being positioned adjacent to said opening, each blade of said plurality of blades being configured to overlap an adjacent blade;
   a blade actuator operably connected to each blade of said plurality of blades, said blade actuator comprising a fixed first end and a second end, said blade actuator being configured to contract upon a current being applied to said blade actuator;
   a toothed rack connected to said second end of said blade actuator, said rack being movable upon contraction of said blade actuator;
   a locking mechanism movable between an engaged configuration and a disengaged configuration, said locking mechanism being configured to operably engage said rack upon being set in said engaged configuration; and
   a locking mechanism actuator operably connected to said locking mechanism, said blade actuator being configured to contract upon a current being applied to said blade actuator to move said locking mechanism to said disengaged configuration;

wherein said plurality of blades at least partially overlap in succession upon contraction of said blade actuator to at least partially expose said opening; and wherein each blade of said plurality of blades is fixed relative to said adjacent blade upon engagement of said locking mechanism to said rack.

2. The shutter assembly of claim 1 wherein said blade actuator comprises a shape memory alloy wire.

3. The shutter assembly of claim 2 wherein said shape memory alloy wire comprises nickel.

4. The shutter assembly of claim 2 wherein said shape memory alloy wire comprises at least one of a copper-aluminum-nickel alloy and a nickel-titanium alloy.

5. The shutter assembly of claim 1 wherein said rack comprises two racks of opposing teeth.

6. The shutter assembly of claim 1 comprising three of said blades.

7. The shutter assembly of claim 1 wherein said locking mechanism comprises a lever member.

8. The shutter assembly of claim 7 wherein said lever member is pivotably connected to said collar.

9. The shutter assembly of claim 1 wherein said locking mechanism is biased to said engaged configuration.

10. The shutter assembly of claim 1 further comprising a current generating circuit electrically coupled with said blade actuator.

11. The shutter assembly of claim 10 wherein said current generating circuit is further electrically coupled with said locking mechanism actuator.

12. The shutter assembly of claim 2 wherein said shape memory alloy wire comprises a copper-aluminum-nickel alloy.

13. The shutter assembly of claim 2 wherein said shape memory alloy wire comprises a nickel-titanium alloy.

14. The shutter assembly of claim 2 wherein said shape memory alloy wire has a martensite finish temperature between about 30° C. and about 50° C.

15. The shutter assembly of claim 14 wherein said shape memory alloy wire has an austenite finish temperature between about 80° C. and about 100° C.

16. The shutter assembly of claim 1 wherein said collar comprises a continuous sidewall.

17. The shutter assembly of claim 16 wherein said continuous sidewall comprises threading on an interior surface thereof.

18. The shutter assembly of claim 1 wherein each of the blade of said plurality of blades is pivotably connected to another blade of said plurality of blades.

19. The shutter assembly of claim 1 wherein said locking mechanism actuator comprises a shape memory alloy wire.

20. The shutter assembly of claim 19 wherein said shape memory alloy wire comprises nickel.

* * * * *